3,660,574
METHOD OF CONTROLLING FERTILITY EMPLOYING QUINGESTANOL ACETATE
Edel Berman, Morristown, N.J., assignor to Warner-Lambert Company, Morris Plains, N.J.
No Drawing. Filed Sept. 11, 1969, Ser. No. 857,215
Int. Cl. A61k 27/00; C07c 169/00
U.S. Cl. 424—238                                          1 Claim

ABSTRACT OF THE DISCLOSURE

A method is described for controlling the incidence of pregnancy. The method comprises the oral ingestion, by fertile women of child-bearing age within twenty-four hours after coitus, of a pharmaceutical composition containing, as the sole active ingredient, from about 0.5 mg. to about 1.0 mg., and preferably, from about 0.5 mg. to about 0.8 mg., of quingestanol acetate.

BACKGROUND OF THE INVENTION

The ability of certain steroidal compounds to inhibit ovulation and, hence, to prevent conception, is now well known. Generally, ovulation inhibition is achieved by the administration of a medicament which has been proven to be effective for such purpose, usually for twenty consecutive days in each month. However, in my pending U.S. patent application Ser. No. 596,081, filed Nov. 22, 1966 and now abandoned, a different concept of fertility control is described. In the latter method, pregnancy is prevented by the administration, at relatively widely spaced time intervals, of a single fertility-inhibiting dose of quinestrol, i.e. the cyclopentyl ether of 17α-ethynyl estradiol. In the method, any time a normal cycle is desired, shedding of the endometrium is effected by the administration of a progestogen, such as, norethindrone acetate, medroxy progesterone acetate, chlormadinone acetate, quingestanol acetate, etc.

While the method described in U.S. patent application Ser. No. 596,081 has certain advantages over methods which require daily medication, it too requires adherence to a prescribed sequence. The method of the present invention differs from the aforementioned prior art methods in that it is not sequence oriented. Rather, it involves only the oral ingestion, within twenty-four hours after coitus, of a pharmaceutical composition containing an effective fertility-inhibiting dosage of quingestanol acetate as the sole active ingredient.

BRIEF SUMMARY OF THE INVENTION

The present invention is a method for controlling the incidence of pregnancy in fertile women of child-bearing age. The method involves the administration or ingestion, orally, to fertile women of child-bearing age, within twenty-four hours after coitus, of from about 0.5 mg. to about 1.0 mg., and preferably from about 0.5 mg. to about 0.8 mg., of quingestanol acetate, the medication being provided as a pharmaceutical composition in unit dosage form in which quingestanol acetate is present as the sole active ingredient.

DETAILED DESCRIPTION

Quingestanol acetate, i.e. 17-ethynyl-19-nortestosterone acetate-3-cyclopentyl enol ether, is a known compound having recognized progestational activity. It has been found that when quingestanol acetate is formulated into a pharmaceutical composition in unit dosage form and administered or ingested orally, within twenty-four hours after coitus to provide the female subject with a dosage of from about 0.5 mg. to about 1.0 mg. of active ingredient, the incidence of pregnancy in such subjects is substantially reduced. In the preferred embodiment of the invention, a dosage of from about 0.5 mg. to about 0.8 mg. of quingestanol acetate is administered or ingested orally within twenty-four hours after coitus.

In the practice of the invention, quingestanol acetate is formulated into a pharmaceutical composition which is suitable for oral administration. Such dosage forms include, for example, capsules, tablets, elixirs, suspensions, etc. In producing such compositions, any of the various non-toxic pharmaceutically acceptable adjuvants or excipients customarily employed in producing solid or liquid medicaments for oral administration can be employed. These adjuvants and excipients include, for example, substances, such as, water, gelatin, lactose, starches, magnesium stearate, talc, gums, etc. Conventional methods and techniques are utilized in formulating the various dosage forms.

The quantity of active ingredient, i.e. quingestanol acetate, which is incorporated into the oral dosage forms which are used in carrying out this invention is variable. For example, tablets, capsules, etc. containing from about 0.5 mg. of quingestanol acetate to about 1.0 mg. of quingestanol acetate can be produced by conventional procedures. In the practice of the invention, a single capsule or tablet containing 0.5 mg. or 1.0 mg. of quingestanol acetate, or two capsules or tablets containing 0.5 mg. of quingestanol acetate can be ingested or administered within twenty-four hours after coitus with good results. The compositions which are employed in the preferred embodiment of the invention are soft shell, gelatin capsules, which contain either 0.5 mg. or 0.8 mg. of quingestanol acetate. One such capsule is ingested or administered within twenty-four hours after coitus. In any event, one or more tablets, capsules, etc. are ingested orally by the female subject within twenty-four hours after coitus, so as to provide a total dosage of quingestanol acetate which is not less than about 0.5 mg. and not more than about 1.0 mg. In the preferred embodiment of the invention, one or more tablets, capsules, etc. which provide a dosage of from about 0.5 mg. to about 0.8 mg. of quingestanol acetate, are administered or ingested within twenty-four hours after coitus.

As compared to the fertility control methods presently employed in the art, the present method offers certain distinct advantages. The prior art methods depend upon rigid adherence to a sequential ingestion of the anti-fertility drug. Any variance in the sequence makes a pregnancy increasingly liable. Furthermore, if the sequence therapy of the prior art is utilized in female subjects who have a history of irregular or short cycles, the precise timing required to make the treatment effective is a definite disadvantage. The possibility of pregnancy is even greater when the effectiveness of the therapy is dependent upon a menstrual cycle which must be exactly timed. To a certain extent, at least, the present method for controlling fertility eliminates the disadvantageous features of the prior art methods. The method of this invention does not require the adherence to a definite schedule or sequence of medication. Rather, pregnancy can be averted merely by the ingestion of the quingestanol acetate-containing composition of this invention within twenty-four hours after coitus. Thus, the invention provides an improved method for controlling pregnancy which can be utilized safely, with reliable and dependable results, in all female subjects. The efficacy of the method of the invention is not influenced and it is not at all dependent upon the length or regularity of the menstrual cycle. Additionally, the method of the invention can be practiced by women who are incapable of, or unwilling to, adhere to a precise daily schedule such as is required in the sequential methods of the prior art. Furthermore, in addition to being an effective means for controlling fertility, the present method produces a minimum of adverse side effects. The only important adverse effect reported was breakthrough bleeding, reported in 10% of the cycles.

For a fuller understanding of the nature and objects of this invention, reference may be had to the following examples which are given merely as further illustrations of the invention and are not to be construed in a limiting sense.

EXAMPLE 1

Clinical studies have been conducted, the subjects of which were fertile, married women of child-bearing age. In the first study, the female subjects were instructed to ingest a soft shell gelatin capsule containing 0.5 mg. of quingestanol acetate within twenty-four hours after coitus. In this first study, 117 female subjects were involved for 514 cycles. In a second comparison study, fertile, married women of child-bearing age were instructed to ingest a soft shell gelatin capsule containing 0.8 mg. of quingestanol acetate within twenty-four hours after coitus. In the latter study, 200 female subjects were involved for 1004 cycles. In the two studies, an average of 11 capsules were taken per menstrual cycle. In each study, the gelatin capsules used contained a solution of quingestanol acetate in a vegetable oil, a small quantity of amine being present in the solution as a stabilizer.

It was found that, at the lower dose of 0.5 mg. of quingestanol acetate, only five pregnancies resulted in 514 cycles. At the higher dose, i.e. 0.8 mg. of quingestanol acetate, no pregnancies resulted in 1004 cycles.

In each study, the incidence of reported side effects was minimal. The only significant adverse side effect observed in either of the two clinical studies was breakthrough bleeding which was reported in 10% of the cycles.

EXAMPLE 2

This example is included herein to demonstrate the manner in which quingestanol acetate is embodied in the form of a pharmaceutical composition in unit dosage form for use in the practice of this invention.

In the example, sesame oil was charged into a water-jacketed mixing tank, following which the surface of the oil was blanketed with a layer of nitrogen. Thereafter, piperidine was added to the sesame oil and mixed therein until completely dissolved. When the piperidine had become dissolved in the sesame oil, the solution was heated gradually to a temperature within the range of from about 45° C. to about 47 C., following which quingestanol acetate was added. The mixture was stirred at that temperature until the quingestanol acetate was dissolved. The bulk solution, thus obtained, was stored under nitrogen until ready for encapsulation.

In producing the bulk solution described in the preceding paragraph, the ingredients were used in the quantities hereinafter indicated:

| | Mg./capsule |
|---|---|
| Quingestanol acetate | 0.5 |
| Piperidine | 0.043 |
| Sesame oil, U.S.P. | 84.097 |

Subsequently, the bulk solution was encapsulated into individual round soft gelatin capsules, approximately 0.092 ml. of solution being present in each capsule to provide a dosage form containing 0.5 mg. of quingestanol acetate.

EXAMPLE 3

This example is included herein to demonstrate the production of an additional dosage form which contains quingestanol acetate as the sole active ingredient.

In this example, sesame oil was charged into a water-jacketed mixing tank, following which the surface of the oil was blanketed with a layer of nitrogen. Thereafter, piperidine was added to the sesame oil and mixed therein until completely dissolved. When the piperidine had become dissolved in the sesame oil, the solution was heated gradually to a temperature within the range of from about 45 c. to about 47 C., following which quingestanol acetate was added. The mixture was stirred at that temperature until the quingestanol acetate was dissolved. The bulk solution, thus obtained, was stored under nitrogen until ready for encapsulation.

In producing the bulk solution described in the preceding paragraph, the ingredients were used in the quantities hereinafter indicated.

| | Mg./capsule |
|---|---|
| Quingestanol acetate | 0.8 |
| Piperidine | 0.043 |
| Sesame oil, U.S.P. | 83.797 |

Subsequently, the bulk solution was encapsulated (0.092 ml. per capsule) into individual round soft gelatin capsules to provide a dosage form containing 0.8 mg. of quingestanol acetate.

I claim:
1. A method for controlling the incidence of pregnancy in fertile women of child-bearing age which comprises the oral administration to said females of a pharmaceutical composition containing 0.8 mg. of quingestanol acetate in a pharmaceutical carrier, within 24 hours after coitus.

References Cited
UNITED STATES PATENTS 3,549,752  12/1970  Ercoli et al. _____ 424—239

OTHER REFERENCES

Fried et al.: J.A.C.S., vol. 83 pp. 4663-64 (1961).

Falconi et al.: J. Endocrinology, vol. 25, pp. 169–173 (1912).

ALBERT T. MEYERS, Primary Examiner

V. D. TURNER, Assistant Examiner